United States Patent
Bentz et al.

(10) Patent No.: US 6,305,219 B1
(45) Date of Patent: Oct. 23, 2001

(54) METHOD FOR DETERMINING LIQUID QUANTITY IN MICROGRAVITY USING FLUID DYNAMIC POSITIONING

(75) Inventors: Michael D. Bentz, Renton; Daniel E. Hedges, Seattle, both of WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/006,578

(22) Filed: Jan. 13, 1998

(51) Int. Cl.[7] .................................................... G01F 23/00
(52) U.S. Cl. ........................................ 73/290 V; 73/290 R
(58) Field of Search .............................. 73/290 V, 290 R, 73/149

(56) References Cited

U.S. PATENT DOCUMENTS

| | | |
|---|---|---|
| 3,237,451 | 3/1966 | Haeff . |
| 3,988,933 | 11/1976 | Fletcher et al. . |
| 4,898,030 | 2/1990 | Yeh . |
| 4,956,996 | 9/1990 | Morris . |
| 4,984,457 | 1/1991 | Morris . |
| 4,987,775 | 1/1991 | Chobotov . |
| 5,064,153 * | 11/1991 | Gindre et al. .......................... 244/172 |
| 5,386,736 | 2/1995 | Spillman, Jr. . |

* cited by examiner

Primary Examiner—Hezron Williams
Assistant Examiner—Willie Morris Worth
(74) Attorney, Agent, or Firm—Christensen O'Connor Johnson Kindness PLLC

(57) ABSTRACT

A method for determining liquid quantity in a tank holding liquid and a plurality of vapor bubbles in a microgravity environment includes a jet inducer and a sensor for providing a signal proportional to the volume of liquid in the tank. The jet inducer, comprising of a pump and a nozzle, induces a recirculating jet in the tank. The liquid jet merges the plurality of vapor bubbles into a single, nearly spherical vapor bubble and holds the single vapor bubble in a stable location at one end of the container. One or more ultrasonic sensors, at the other end of the tank, measure the distance from the single vapor bubble to the sensor or sensors and generates a signal proportional to the distance measured. A CPU receives and adjusts the signal or signals and generates a readout indicating the volume of the liquid in the container.

7 Claims, 4 Drawing Sheets

METHOD FOR DETERMINING LIQUID QUANTITY IN MICROGRAVITY USING FLUID DYNAMIC POSITIONING

FIELD OF THE INVENTION

The present invention relates generally to methods for determining the quantity of liquid in a container. More particularly, the present invention relates to methods for determining liquid quantity in a microgravity environment, such as in satellites or other space vehicles.

BACKGROUND OF THE INVENTION

Systems that use liquids, such as propellants and coolants, usually require a means for determining the quantity of liquid remaining in a storage tank. For such systems operating on Earth, determining the quantity of liquid in the storage tank can easily be done because the liquid and ullage form a flat liquid/vapor interface. For example, the height of the liquid in the tank may be measured or the liquid pressure at the bottom of the tank may be gauged.

However, conventional gravity-based liquid measurement methods are not feasible in microgravity environments, such as encountered in Earth orbit or other space travel. Due to the lack of or low gravitational force in such environments, the liquid and ullage may have unknown or uncontrolled locations within the tank, possibly resulting in numerous vapor bubbles dispersed throughout the tank. Consequently, gauging the quantity of liquid in the tank cannot be readily carried out by conventional means.

Several methods are known for attempting to gauge liquid quantity in microgravity environments. One such method, commonly termed the mass-accounting method, requires knowledge of the initial liquid quantity and of all subsequent usage rates. The amount of liquid remaining is simply the difference between the initial quantity and the quantity estimated to have been removed. This method poses accuracy concerns because it does not account for leakage losses. Accuracy concerns also arise from tolerance buildup. That is, this method relies on prior measurements of initial mass and usage rates to infer the current quantity, rather than on direct measurements of the current quantity. The errors in the prior measurements, even if insignificant in themselves, add up to a significant error in the calculation of the current quantity.

Another method, called nucleonic or radiation attenuation gauging, involves placing a radiation source on one side of the tank and a Geiger counter on the other side of the tank. Liquid between the source and the Geiger counter attenuates the radiation. Therefore, the volume of the liquid in the tank can be inferred from the amount of radiation detected by the Geiger counter. However, this method creates safety hazards and side effects of radiation on the electronics. In addition, this method is impractical for use with large tanks or in a high background radiation environment.

Yet another method involves imparting an acceleration to the space vehicle, thereby settling the liquids and allowing the liquid level to be sensed. This method has several drawbacks. This method causes disturbances to the space vehicle and requires expenditure of significant amounts of propellants.

Other methods measure the change in pressure upon addition of either heat or gas to determine the volume of the liquid in the tank. These methods also have drawbacks. The determination of the quantity of liquid is subject to significant errors if the liquid is not isothermal. Isothermal conditions are unlikely in cryogen tanks, especially during expulsion or fill, unless the contents of the tank are actively mixed. Furthermore, since these methods require the injection of noncondensible gas or heat each time a pressure reading is taken, there is a limit to the number of measurements that can be taken.

Accordingly, it is an object of this invention to provide a method and system for determining liquid quantity in a tank in microgravity in which tolerance buildup and leakage losses will not adversely affect the accuracy of the determination.

It is another object of this invention to provide a method and system for determining liquid quantity in a tank in microgravity which eliminates radiation concerns.

It is yet another object of this invention to provide a method and system for determining liquid quantity in a tank in microgravity which does not require the use of a settling thrust on the spacecraft.

It is yet another object of this invention to provide a method and system for determining liquid quantity in a tank in microgravity which does not require injecting gas into the tank each time a determination of liquid quantity is made.

It is yet another object of this invention to provide a method and system for determining liquid quantity in a tank in microgravity which does not limit application to isothermal fluids.

SUMMARY OF THE INVENTION

The present invention is a method and system for determining the quantity of liquid in a container holding liquid and a plurality of vapor bubbles in a microgravity environment, using fluid dynamic positioning. The method comprises the steps of:

inducing a liquid jet in the liquid to merge the plurality of vapor bubbles into a single vapor bubble of predictable shape;

positioning and holding the single vapor bubble in a known location in the container, sensing the dimension of the liquid in the container; and determining the volume of liquid in the container based on the dimension in the previous step.

The system comprises:

means for inducing a jet in the liquid in the container to merge the plurality of vapor bubbles into a single vapor bubble;

at least one sensor to sense a dimension of the liquid in the container and to provide a signal or signals proportional to the dimension of liquid; and a CPU for receiving and interpreting the signal or signals and generating a readout indicating the volume of liquid or vapor in the container.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PRESENT INVENTION

Figure 1:
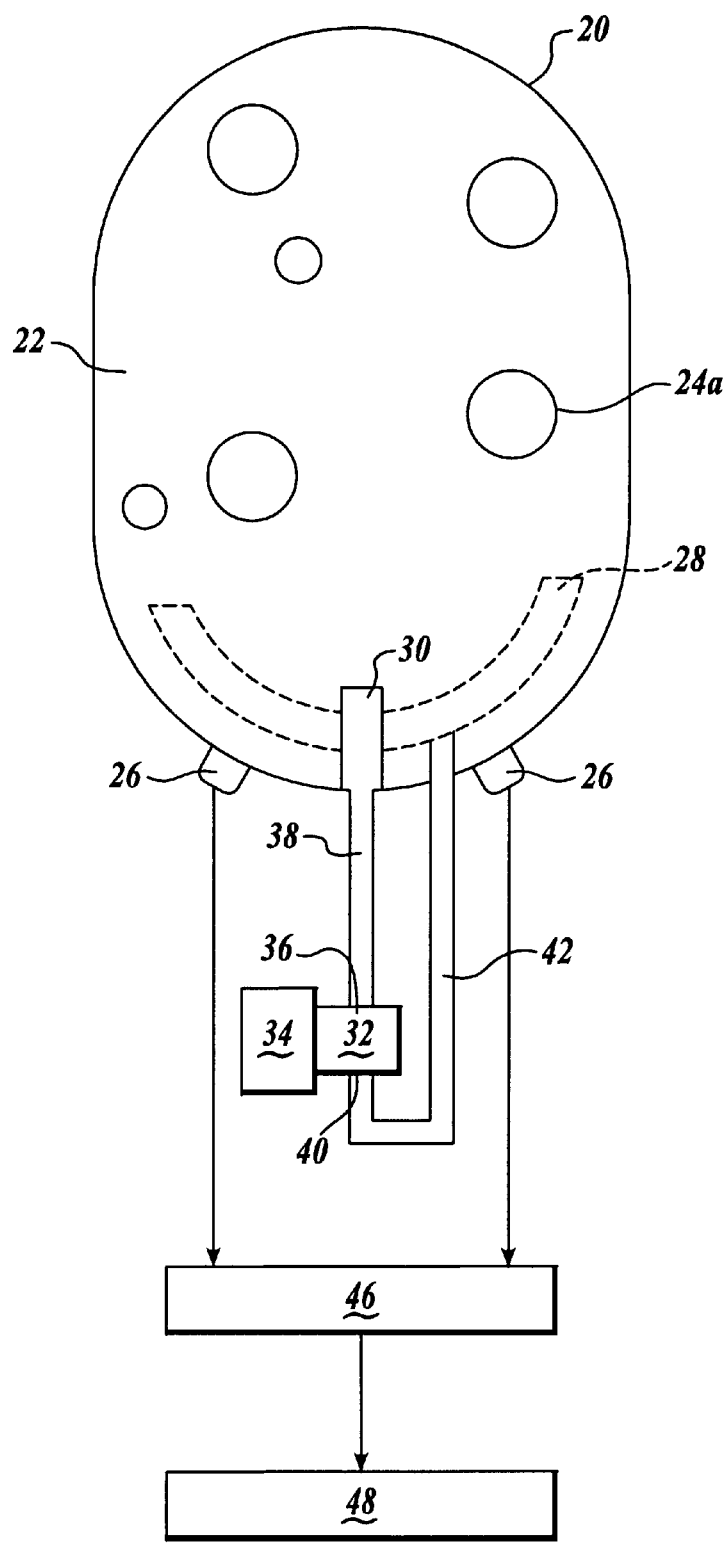
FIG. 1 is a schematic diagram of a tank containing liquid and numerous vapor bubbles, showing a pump in the off mode.
Figure 2A:
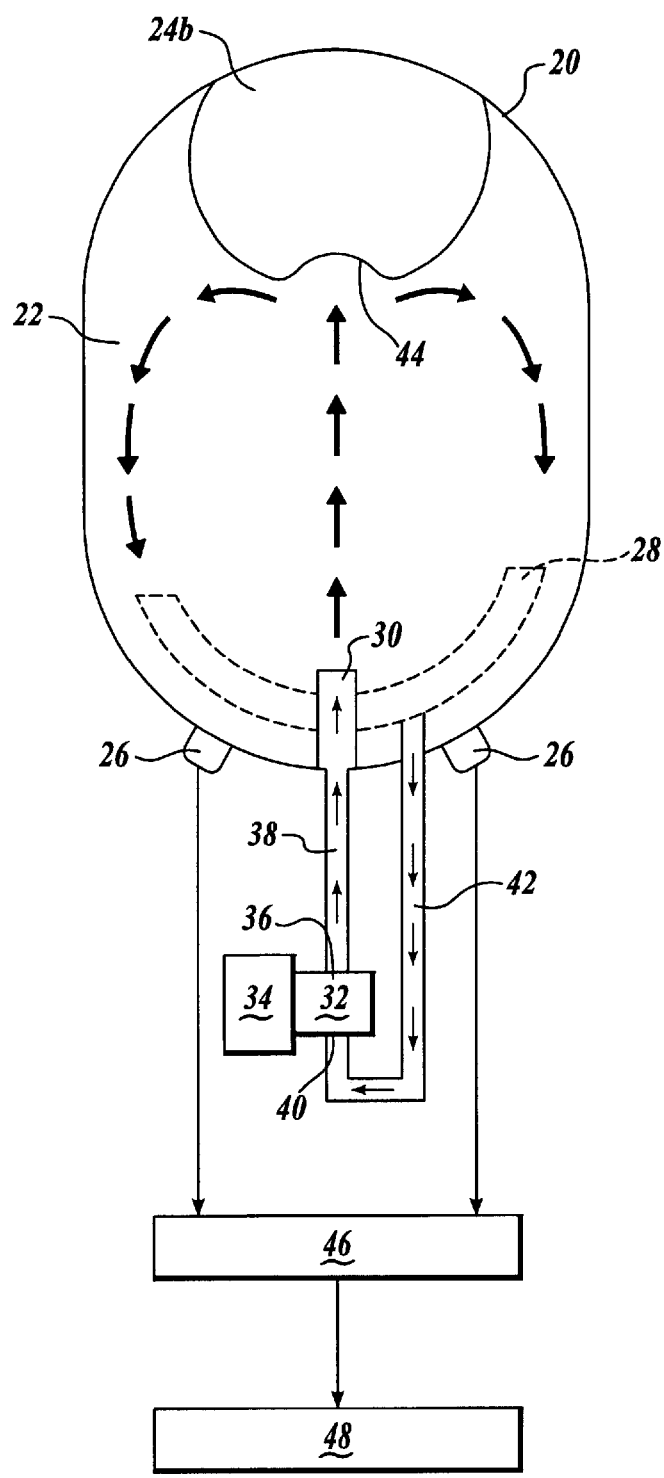
FIG. 2a is a schematic diagram of the tank at a high fill level of 84%, showing the pump in the on mode.
Figure 2B:
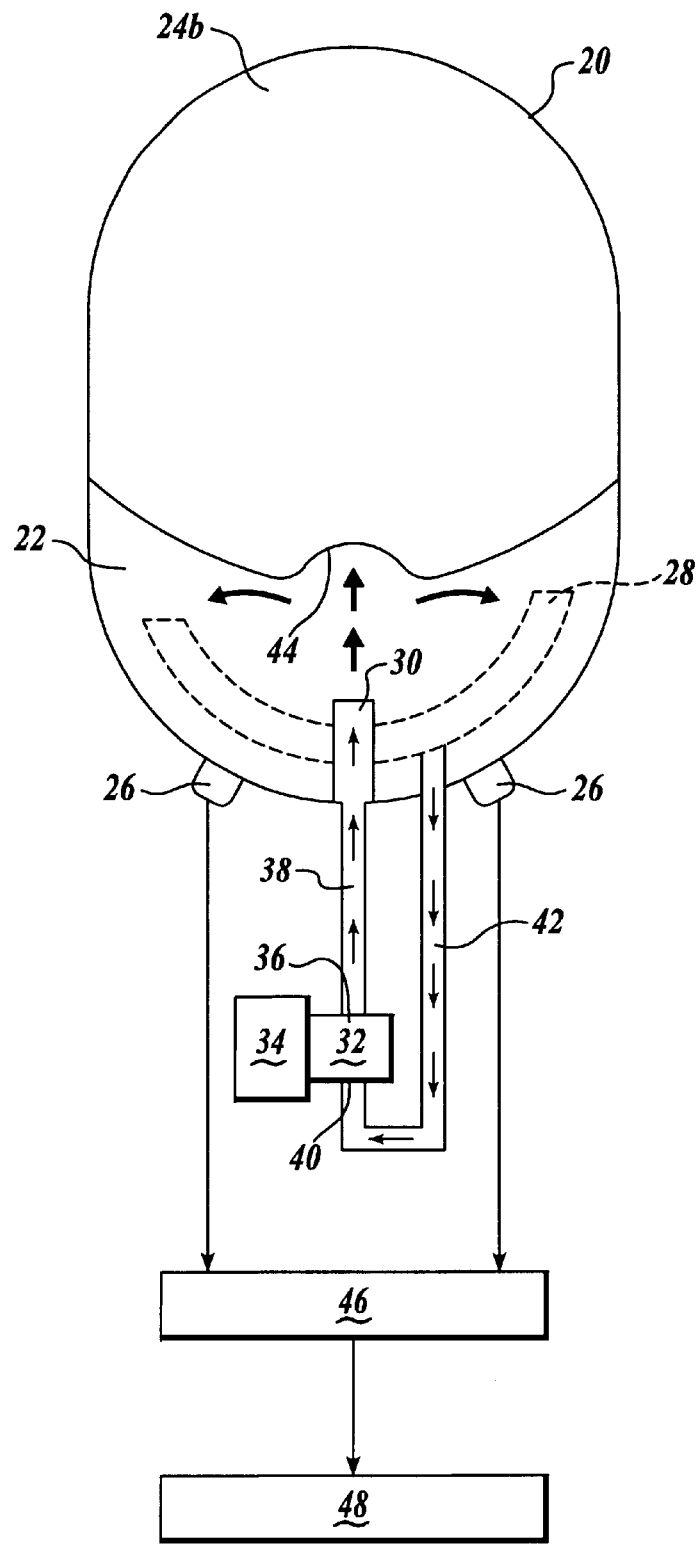
FIG. 2b is a schematic diagram of the tank at a low fill level of 39%, showing the pump in the on mode.

Referring to FIG. 1, a tank 20 contains liquid 22 and possibly numerous vapor bubbles 24a in a microgravity environment. The vapor is broken up into possibly numerous vapor bubbles 24a because of the lack of or little gravitational force. The numerous liquid/vapor interfaces render measurement of the volume of liquid 22 difficult. To make the measurement of the volume of liquid 22 more readily ascertainable, the system according to the present invention merges the numerous vapor bubbles 24a into a single, nearly spherical vapor bubble 24b, as is schematically illustrated in FIGS. 2a and 2b.

Still referring to FIG. 1, in an actual embodiment, the tank 20 is elongated and has hemispherical ends. In the actual embodiment, the tank 20 is fourteen inches long and ten inches in diameter. Two ultrasonic sensors 26 are located at one hemispherical end, preferably external to the tank 20 to avoid leakage and safety concerns. The two ultrasonic sensors 26 are positioned equidistant from the tank's major axis. A liquid acquisition device 28 is positioned at the same hemispherical end as the ultrasonic sensors 26 and is located internally to the tank 20. The liquid acquisition device 28 can be of various conventional types, including the screen-channel type as schematically illustrated in FIG. 1. In addition, a jet inducer is positioned at the same hemispherical end as the ultrasonic sensors 26.

The jet inducer includes a nozzle 30 and a pump 32 with a motor 34. The nozzle 30 can be any of a variety of types of nozzles, including straight tube, diverging, converging, and ejector nozzles. In the actual embodiment, the nozzle 30 is a straight tube nozzle with an inside diameter of 0.4 inches. The nozzle 30 lies on the tank's major axis and is located at the same hemispherical end as the sensors 26. The nozzle 30 is directed toward the other hemispherical end, away from the ultrasonic sensors 26.

The pump 32 can be any of a variety of types of pumps, including gear, vane, axial, and centrifugal-type pumps. Although the pump can be located internally or externally to the tank 20, it may be more convenient to locate the pump externally because positioning the pump 32 externally permits use of a conventional, as opposed to an immersible pump. A pipe assembly 38 couples the outlet 36 of the pump 32 to the nozzle 30 and another pipe assembly 42 couples the inlet 40 of the pump 32 to the liquid acquisition device 28.

FIGS. 2a and 2b schematically illustrate the tank 20 with the pump 32 in the on mode. In use, the liquid acquisition device 28 withdraws liquid 22 from the tank 20 while excluding vapor 24a. The withdrawn liquid flows through the pipe assembly 42, as indicated by the lighter arrows, and is supplied to the pump 32 at the inlet 40 of the pump 32. The pump then pumps the withdrawn liquid from the pump outlet 36, through the pipe line 38, and to the nozzle 30. The flow of the withdrawn liquid, from the pump outlet 36 to the nozzle 30, is also indicated by the lighter arrows.

The withdrawn liquid is then injected into the tank 20 through the nozzle 30, thereby inducing a recirculating liquid jet, indicated by the darker arrows. The liquid jet causes liquid circulation within the tank which merges the vapor bubbles 24a into a single, nearly spherical vapor bubble 24b. The liquid jet impinges on the vapor bubble 24b and forms a dimple 44 on the vapor bubble, without penetrating the interface. The liquid jet holds the single vapor bubble 24b stable at the hemispherical end away from the nozzle 30. FIG. 2a schematically illustrates a single vapor bubble 24b when the tank 20 is at a high fill level of 84% and FIG. 2b schematically illustrates a single vapor bubble 24b when the tank 20 is at a low fill level of 39%.

Each ultrasonic sensor 26 measures the distance between the liquid/vapor interface (i.e., the outer edge of the single vapor bubble 24b) to the ultrasonic sensor and generates a signal proportional to this distance. For example, the signal can be the time delay of the sound wave reflection. A CPU 46 receives the signals generated by the two sensors 26. The CPU 46 interprets the signals to generate a readout 48 indicating the volume of liquid 22 in the tank 20 or the fill level of the tank 22.

Figure 3:
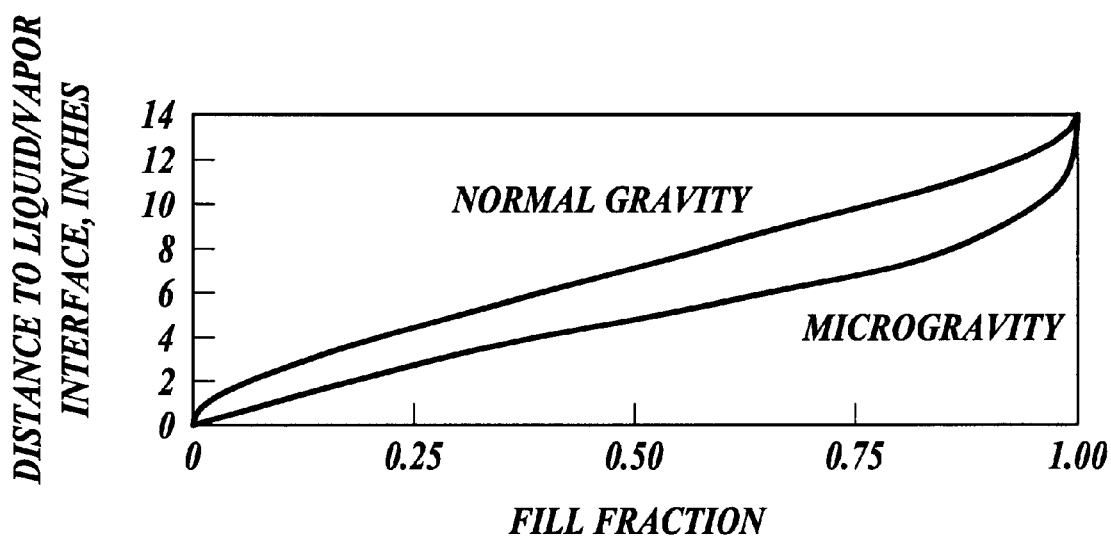
FIG. 3 is a graph of the expected calibration curves for a fourteen-inch long, ten-inch in diameter, cylindrical tank with hemispherical ends.

The CPU 46 adjusts the received signals according to expected calibration curves, such as those shown in FIG. 3 for the actual embodiment. For example, in a nucrogravity environment, when the received signal indicates that the distance from the vapor bubble 24b to the sensors 26 is two inches, the CPU 46 generates a readout 48 indicating that the tank according to the actual embodiment is one -fifth full. Calibration curves for tanks and nozzles having other dimensions can be analytically derived based on simple assumptions about the liquid orientation. The graph illustrated in FIG. 3 is based on the assumption that the flow rate of the jet is such that the momentum of the liquid jet is suitable. Additionally, it is assumed that the single vapor bubble is spherical with a diameter that becomes larger as the tank's fill level is decreased. When the fill level of the tank is decreased to the point in which the diameter of the vapor bubble 24b becomes equal to the diameter of the tank 20, it is assumed that the liquid/vapor interface becomes hemispherical in shape and the interface approaches the ultrasonic sensors 26 as the fill level of the tank 29 is further decreased.

As discussed above, the sensors 26 are used to sense a dimension of the liquid in the container, which is done by measuring the distance to the single vapor bubble 24b, and the distance is used to calculate the volume of the liquid 22. However, before measuring this distance, a single vapor bubble 24b needs to be formed from the numerous vapor bubbles 24a. In order to achieve this, the flow rate of the liquid jet must be suitable. The jet Weber number, $We_j$, is useful as a predictor of the flow pattern of the liquid jet. $We_j$ is defined as the ratio of the jet's momentum rate, or thrust, to the surface tension force at the liquid/vapor interface.

$$We_j = \frac{\rho V_0^2 R_0^2}{\sigma D_j},$$

where $\rho$ is the liquid density, $V_0$ is the jet nozzle outlet velocity, $R_0$ is the radius of the nozzle 30, $\sigma$ is the surface tension force at the liquid/vapor interface and $D_j$ is the diameter of the jet at the liquid/vapor interface. The optimum Weber number is on the order of 1.0, such that the momentum of the jet is sufficient to merge the numerous vapor bubbles into a single, nearly spherical vapor bubble and to hold the single vapor bubble in a stable location, while not penetrating and breaking up the single vapor bubble. For the actual embodiment, in which the tank 20 is fourteen inches long by ten inches wide and the inside diameter of the nozzle is 0.4 inches, the flow rate should range from 0.54 to 0.84 liters/minute. These flow rates correspond to a Weber number of 0.7 to 1.7 when the fill level is between 39% and 84%.

While the preferred embodiment of the invention has been illustrated and described, it will be appreciated that various changes can be made therein without departing from the spirit and scope of the invention. For example, the ultrasonic sensors 26 can be ultrasonic point sensors, scanning sensors or other types of depth sensors that are not necessarily ultrasonic. Furthermore, the tank size and shape can vary. Additionally, the liquid acquisition device 30 is optional. If the liquid acquisition device 30 is not used, then the motor 34 could be designed to speed up if vapor, rather than liquid, is ingested into the pump 32. Furthermore, if it is desirable to vary the flow rate of the liquid jet, a flowmeter can be coupled to the pump 34.

The embodiments of the invention in which an exclusive property or privilege is claimed are defined as follows:

1. A method for determining liquid quantity in a container holding liquid and a plurality of vapor bubbles in zero or low gravity, the method comprising the steps of:

inducing a liquid jet at a flow rate suitable to merge the plurality of vapor bubbles into a single vapor bubble of predictable shape and position and hold the single vapor bubble in a known location in the container;

sensing a dimension of the liquid in the container; and calculating the volume of liquid in the container based on the dimension sensed in the previous step.

2. A system for determining liquid quantity in a container holding liquid and a plurality of vapor bubbles in zero or low gravity, the system comprising:

a means for inducing a jet in the liquid in the container at a flow rate suitable to merge the plurality of vapor bubbles into a single vapor bubble;

at least one sensor to sense a dimension of the liquid in the container and to provide a signal proportional to the dimension of the liquid; and a CPU for receiving and interpreting the signal, for calculating the volume of liquid or vapor in the container and for generating a readout indicating the volume of liquid or vapor in the container.

3. The system of claim 2, wherein the means for inducing a jet comprises:

a pump, having a pump inlet and a pump outlet, for withdrawing liquid and/or vapor from the container and reinjecting the withdrawn liquid and/or vapor into the container;

a pipe assembly for coupling the pump inlet to the container; and a nozzle coupled to the pump outlet for directing the withdrawn liquid and/or vapor into the container.

4. The system of claim 3, further comprising a liquid acquisition device, coupled to the pump inlet through the pipe assembly, for withdrawing liquid from the container and excluding vapor, thereby supplying the pump with liquid.

5. The system of claim 2, wherein the sensor comprises an ultrasonic sensor.

6. The method defined in claim 1, including inducing the liquid jet with a Weber number of 0.7 to 1.7.

7. The system defined in claim 2, in which the jet inducing means induces a jet having a Weber number of 0.7 to 1.7.

* * * * *